United States Patent
Price et al.

[11] Patent Number: 5,275,013
[45] Date of Patent: Jan. 4, 1994

[54] REUSABLE TUBE PIERCING TOOL FOR REFRIGERANT RECOVERY

[76] Inventors: Leslie D. Price, 3429 Fountain Cr., Montgomery, Ala. 36116; Frederick M. Scheiben, 1557 Lacmine Hill Rd., Wetumpka, both of Ala. 36092

[21] Appl. No.: 950,296
[22] Filed: Sep. 24, 1992
[51] Int. Cl.⁵ .................................. F25B 45/00
[52] U.S. Cl. .......................... 62/292; 137/318; 285/197; 285/379
[58] Field of Search ............. 62/292; 137/318, 321; 285/197, 198, 199, 379

[56] References Cited

U.S. PATENT DOCUMENTS

| | | | |
|---|---|---|---|
| 3,252,475 | 5/1966 | Jones | 137/318 |
| 3,978,881 | 9/1976 | Mouranie | 137/318 |
| 4,069,686 | 1/1978 | Hoelman | 62/292 |
| 4,204,559 | 5/1980 | Wagner | 137/318 |
| 4,458,497 | 7/1984 | Kubik | 62/77 |
| 4,537,214 | 8/1985 | Cowan | 137/318 |
| 5,025,633 | 6/1991 | Furmanek | 62/77 |
| 5,080,132 | 1/1992 | Manz et al. | 62/292 |

*Primary Examiner*—John M. Sollecito
*Attorney, Agent, or Firm*—Jacobson, Price, Holman & Stern

[57] ABSTRACT

A refrigerant tube piercing tool capable of being removably and sealingly mounted on a refrigerant tube of copper or the like in a sealed refrigerant system to enable the recovery of refrigerant from the sealed system without discharge into the atmosphere. The tool includes a pair of clamp members one of which includes a sealing member and passageway combined with a threaded, pointed piercing member that is manually threaded into engagement with the tube for forming a hole therein and a fitting having a Schrader valve incorporated therein to which a hose leading to a recovery tank can be connected to enable refrigerant to be transferred into the recovery tank for subsequent use. The tool is reusable and can be removed after the refrigerant has been transferred into the recovery tank in order that the leak or other problem with respect to the refrigerant system can be repaired at which time the hole formed in the tube is closed by soldering or the like with the refrigerant system then being recharged.

3 Claims, 1 Drawing Sheet

REUSABLE TUBE PIERCING TOOL FOR REFRIGERANT RECOVERY

BACKGROUND OF THE INVENTION

1. FIELD OF THE INVENTION

The present invention generally relates to refrigerant recovery and more specifically a refrigerant tube piercing tool capable of being removably and sealingly mounted on a refrigerant tube of copper or the like in a sealed refrigerant system to enable the recovery of refrigerant from the sealed system without discharge into the atmosphere. The tool includes a pair of clamp members one of which includes a sealing member and passageway combined with a threaded, pointed piercing member that is manually threaded into engagement with the tube for forming a hole therein and a fitting having a Schrader valve incorporated therein to which a hose leading to a recovery tank can be connected to enable refrigerant to be transferred into the recovery tank for subsequent use. The tool is reusable and can be removed after the refrigerant has been transferred into the recovery tank in order that the leak or other problem with respect to the refrigerant system can be repaired at which time the hole formed in the tube is closed by soldering or the like with the refrigerant system then being recharged.

2. DESCRIPTION OF THE PRIOR ART

Chlorofluorocarbons (CFC) have been used for many years for refrigerants in various refrigeration systems. "Freon" has been used as a heat transfer medium in various refrigeration systems such as household refrigerators and freezers, air conditioners and the like. Recently legislation prohibits venting of refrigerants into the atmosphere since it is believed that the refrigerants have a detrimental impact when released into the atmosphere. Accordingly, a service technician must first recover the refrigerant from a sealed refrigeration system prior to repairs being made. Various efforts have been made to recover the refrigerants by transferring the refrigerant to a recovery tank for reuse after any contaminants have been removed.

The following U.S. patents relate to this field of endeavor.

U.S. Pat. No. 3,252,475
U.S. Pat. No. 4,069,686
U.S. Pat. No. 4,458,497
U.S. Pat. No. 5,025,633
U.S. Pat. No. 5,080,132

While the prior art utilizes permanent line taps or access valves soldered onto a refrigerant tube, such valves are not allowed to remain on sealed refrigeration systems after repairs have been completed. The prior art does not disclose a reusable tube piercing tool which is clamped onto the tube after which a piercing member is actuated manually to pierce a hole into the tube with the piercing member then being retracted while maintaining the sealed integrity of the refrigerant due to a seal around the piercing member and a Schrader valve in a discharge fitting adapted to be threadedly connected to a charging hose that extends to a recovery tank and which will open the Schrader valve when attached to a threaded fitting on the tool.

SUMMARY OF THE INVENTION

An object of the present invention is to provide a reusable refrigerant tube piercing tool to enable refrigerant recovery from a refrigeration system which includes a clamp member securely mounted on a refrigerant tube in sealed relation thereto together with a pointed penetrating member threadedly mounted on the clamp in sealed relation thereto by which the penetrating member can be manually screw threaded inwardly to form an opening in the refrigerant tube and then threaded outwardly to enable outflow of refrigerant from the tube with the sealed clamp preventing refrigerant from venting into the atmosphere with the refrigerant being safely transferred to a refrigerant recovery tank through a Schrader valve on the clamp to which a charging hose can be connected.

Another object of the invention is to provide a tube piercing tool in accordance with the preceding object in which the clamp includes a pair of members oriented in facing relation with each of the members including a tube receiving recess therein with one of the recesses including a resilient seal engaging the surface of the tube with the penetrating member extending through the seal into engagement with the tube when penetrating the tube.

A further object of the invention is to provide a tube piecing tool in accordance with the preceding objects in which the two clamp members are connected together for movement toward and away from each other by a manually operated screw threaded assembly and the penetrating member is provided with a knurad knob or hand wheel on an outer end to enable the pointed member to be manually rotated for inward and outward movement in relation to the clamp.

Still another object of the invention is to provide a tube piercing tool to enable effective recovery of refrigerant without venting into the atmosphere with the tool being reusable, simple and dependable in operation and relatively inexpensive and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
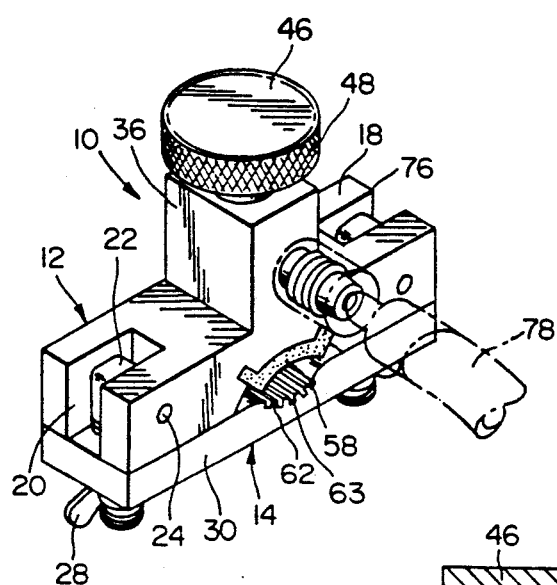
FIG. 1 is a perspective view of the tube piercing tool of the present invention.

Referring now specifically to the drawings, the tube piercing tool of the present invention is generally designated by reference numeral 10 and is in the form of a clamp having a pair of clamp members generally designated by numerals 12 and 14 which can be moved toward and away from each other in a manner to receive a refrigerant tube 16 therebetween in a manner described in more detail hereafter.

Figure 2:
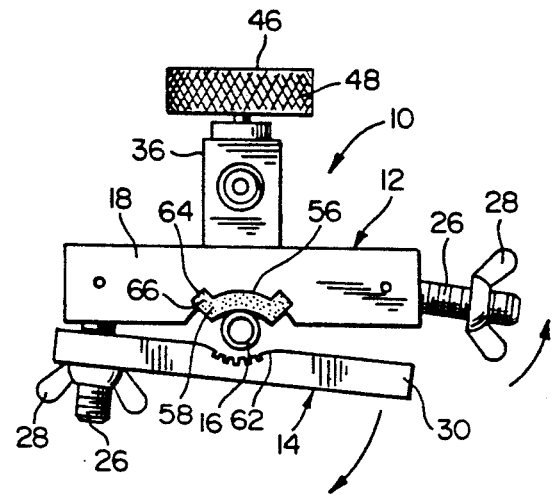
FIG. 2 is a side elevational thereof illustrating the manner of assembly of the tool onto a refrigerant tube.

The clamp member 12 includes an elongated, generally rectangular body 18 having an inwardly extending end slot 20 in each end thereof with each slot receiving a clamp screw 22 which is pivotally secured to the body by a pivot pin 24 which may be in the form of a roll pin. Each clamp screw 22 includes a threaded end portion 26 receiving a wing nut 28 thereon. The clamp member 14 is also a body 30 of rectangular configuration having the same perimeter as the body 18 but being substantially less thick than the body 18 as illustrated. One end of the body 30 includes an aperture 32 which receives one of the clamp screws 22 and the other end of the body 30 includes an inwardly extending slot 34 which receives the other clamp screw 22 but enables separation of that clamp screw by outward swinging movement of the clamp screw when the wing nut 28 has been loosened as illustrated in FIG. 2 which will enable the clamp member 14 to swing downwardly away from the clamp member 12 when the wing nuts 28 are loosened and the clamp screw received in the slot 34 is pivoted outwardly to disengage from the clamp member 14. This enables the tool to be mounted on the tube 16 by inserting the open end of the tool over the tube 16 and moving it laterally so that the tube 16 is centrally disposed in the tool 10 at which time the outwardly pivoted clamp screw 22 can then be swung inwardly into the slot 34 and the wing nuts 28 tightened uniformly.

The body 18 includes a lateral extension 36 having a passageway 38 extending from the bottom surface of the body 18 to the upper end of the extension 38 with a portion of the passageway 38 being internally threaded as at 40 for screw threaded engagement by an externally threaded piercing member 42 which has a reduced diameter pointed lower end portion 44. The upper end of the piercing member 42 is provided with a cylindrical knob 46 provided with a knurled outer surface 48 to enable the knob 46 to be grasped and rotated to move the pointed end 44 of the piercing member 42 inwardly and outwardly in relation to the tool 10. The upper end of the extension is provided with an externally threaded reduced upper end portion 50 that screw threadedly receives a packing nut 52 retaining a seal 54 in a shallow recess in the upper end of the extension 36 to seal the piercing member 42 in relation to the extension 36 and body 18 with rotation of the knob 46 causing either inward or outward movement of the pointed end 44 of the piercing member 42.

Figure 3:
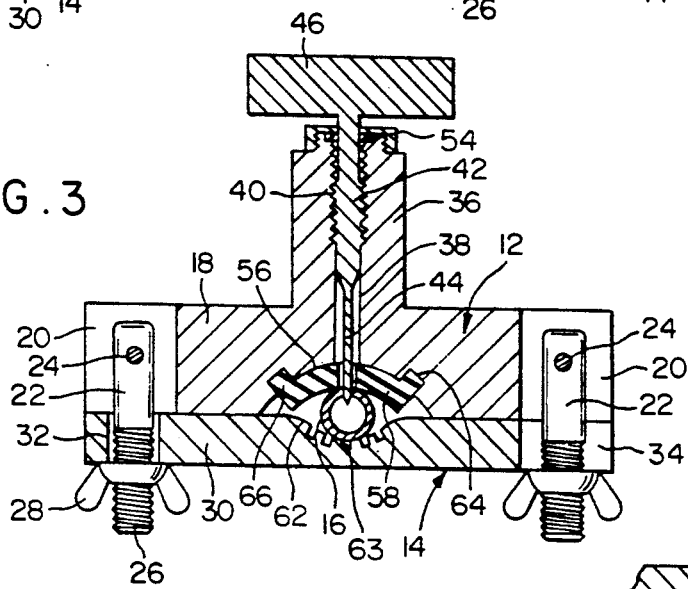
FIG. 3 is a longitudinal, vertical sectional view of the tool illustrating the association of the components of the tool with the refrigerant tube.
Figure 4:
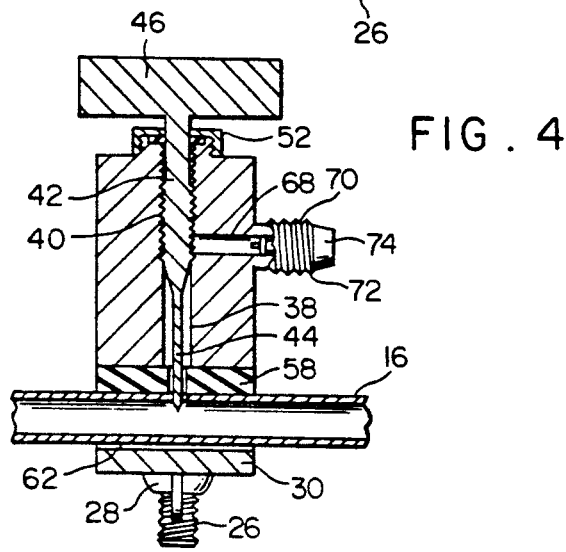
FIG. 4 is a transverse, sectional view illustrating further structural details of the tool as illustrated in FIG. 3 in which the penetrating member is shown in penetrating relation to the tube.
Figure 5:
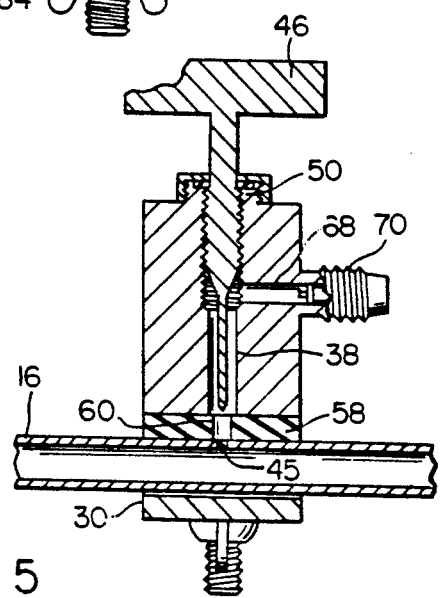
FIG. 5 is a sectional view similar to FIG. 4 but illustrating the penetrating member withdrawn from the tube to enable flow of refrigerant from the tube into the tool which is in sealed relation to the tube and atmosphere.

The bottom surface of the clamp member 12 is provided with an arcuate recess 56 with the passage or cavity 38 communicating with the center thereof. A seal 58 of rubber or similar material is positioned in the recess 50 and is provided with a small opening 60 through which the pointed lower end 44 of the piercing member 42 extends in order to pierce the refrigerant tube 16 which usually is constructed of copper or similar relatively soft material. The upper face of the body 30 forming the lower clamp member 14 is provided with an arcuate concave recess 62 to center the tube 16 in alignment with the pointed lower end 44 of the piercing member 42 as illustrated in FIG. 3. As illustrated in FIG. 2, the recess 56 includes a lateral recess 64 at each end thereof which receives projecting edge portions 66 of the seal 58 in order to mount the seal in place and to enable replacement thereof when necessary.

The extension 36 is provided with a lateral bore or passage 68 which communicates with the passageway 38 and the laterally extending tubular projection 70 forms a continuation of the passageway 38 and is externally threaded at 72. A Schrader valve core 74 is threaded into the passageway 68 which extends through the projection 70 to seal the passageway 68 until the Schrader valve is opened by screw threading an end ferrule 76 connected to a hose 78 which extends to a recovery tank (not shown). The hose 78 may be a conventional charging hose with the rotatable ferrule 76 being screw threaded onto the threads 72 with the hose including a projection which will open the Schrader valve in a well known manner when the ferrule 76 is threaded onto the Schrader valve housing 70. This enables the sealed refrigeration system to be communicated with a recovery tank in order for the refrigerant to be transferred from the refrigeration system to the recovery tank and, if necessary, a pump or compressor may be utilized to further enhance transfer of the refrigerant to the recovery tank. The concave arcuate recesses 56 and 62 and the seal 58 facilitate use of the tool with tubes 16 of different diameters. The concave recess 62 may be provided with grooves 63 to stabilize the clamp with respect to the tube when the clamp members 12 and 14 are moved toward each other by sequential, uniform tightening of the wing nuts 28 on the clamp screws 22. The various components of the tool may be stainless steel or similar materials with the Schrader valve being a conventional structure and used in the same manner as this type of valve is used in automotive tires, air conditioning systems and the like. The seal 58 effectively seals the tool to the tube peripherally of the opening 45 formed in the tube 16 by the pointed end or needle point 44 of the piercing member 42 and the seal 54 effectively seals the shank of the piercing member 42 in relation to the body 18 and extension 36. After the refrigerant has been transferred to a recovery tank, repairs may be made to the refrigeration system and the tool can be removed for reuse with the aperture 45 being closed by solder or the like to retain refrigerant when the refrigeration system is recharged with refrigerant thereby preventing leakage or venting of refrigerant into the atmosphere with the tool being compact, reusable, and effective for preventing venting of refrigerant into the atmosphere with the tool being dependable and long lasting and quite simple to operate.

The foregoing is considered as illustrative only of the principles of the invention. Further, since numerous modifications and changes will readily occur to those skilled in the art, it is not desired to limit the invention to the exact construction and operation shown an described, and, accordingly, all suitable modifications and equivalents may be resorted to, falling within the scope of the invention.

We claim:

1. A tool for recovery of a refrigerant in a sealed refrigeration system including a flow tube forming part of said refrigeration system without discharging the refrigerant into the atmosphere, said tool comprising clamp means mountable on said tube, said clamp means including a passageway communicating an external fitting on the clamp means with an interior surface thereof, resilient seal means between the interior surface of the clamp means and said tube, manually operated tube penetrating means mounted in said passageway for movement toward and away from said tube through said seal means, said penetrating means forming an opening in said tube during movement of the penetrating means into penetrating engagement with said tube thereby communicating the interior of the tube with said passageway, means sealingly mounting the penetrating means in the passageway in the clamp means, and a valved discharge passage in said external fitting communicating with said passageway, said external fitting including means for connecting a recovery hose thereto for transferring refrigerant from the flow tube of a refrigerant system, said valved discharge passage including valve means opened and closed in response to connection and disconnection of a recovery hose to said external fitting, said clamp means including a clamp body having an arcuate recess formed in one end thereof extending transversely thereof and receiving said tube, said passageway having one end terminating in said recess, said seal means being positioned in said recess and extending peripherally of said one end of said passageway, said seal means being arcuately curved and including a concave surface engaging said tube, said recess in the clamp body including a pair of parallel lateral recesses spaced from said passageway, said arcuate seal comprising mounting means including projecting outer edge portions received in said lateral recesses to mount the seal in the arcuate recess.

2. The tool as defined in claim 1 wherein said penetrating means includes an elongated rigid member threadedly mounted in said passageway and including an inner pointed end for penetrating said tube, said rigid member including an outer end extending outwardly of said clamp body, a circular knob mounted on the outer end of said rigid member, said knob having a diameter substantially greater than a diameter of said rigid member for manual rotation thereof without the use of separate tools to move the pointed inner end toward and away from said tube, said means sealingly mounting the penetrating means in the passageway being located where the rigid member exits from said clamp body, said discharge passage communicating with said passageway inwardly of the seal means between the rigid member and passageway, said clamp means also including a clamp member oriented in opposed relation to the end of said clamp body having the recess therein, threaded clamp screws interconnecting said clamp body and said clamp member to secure the clamp body to said tube in sealed relation, said clamp member having an arcuate recess extending transversely thereof and engaging said tube in opposed relation to the arcuate recess in said clamp body.

3. The tool as defined in claim 10 wherein said arcuate recess in the clamp body and the arcuate recess in the clamp member are aligned and indicate a radius of curvature substantially greater than the radius of the tube to receive tubes having different diameters and centering the tube in relation to the passageway and pointed end of the rigid member, said arcuate recess in the clamp member including a plurality of spaced grooves longitudinally engaging said tube to stabilize the clamp means with respect to said tube when clamped thereon.

* * * * *